(12) United States Patent
Cook, Jr.

(10) Patent No.: US 10,759,321 B1
(45) Date of Patent: Sep. 1, 2020

(54) EXTENDABLE TRAILER

(71) Applicant: William Wayne Cook, Jr., Evergreen, AL (US)

(72) Inventor: William Wayne Cook, Jr., Evergreen, AL (US)

( * ) Notice: Subject to any disclaimer, the term of this patent is extended or adjusted under 35 U.S.C. 154(b) by 0 days.

(21) Appl. No.: 16/355,714

(22) Filed: Mar. 16, 2019

(51) Int. Cl.
| | |
|---|---|
| *B60P 1/00* | (2006.01) |
| *B62D 63/06* | (2006.01) |
| *B60P 3/41* | (2006.01) |
| *B62D 53/06* | (2006.01) |
| *B62D 21/20* | (2006.01) |

(52) U.S. Cl.
CPC ............. *B60P 1/006* (2013.01); *B60P 3/41* (2013.01); *B62D 21/20* (2013.01); *B62D 53/067* (2013.01); *B62D 63/061* (2013.01)

(58) Field of Classification Search
CPC .... B60P 1/006; B60P 3/40; B60P 3/41; B62D 21/14; B62D 21/20; B62D 53/067; B62D 63/061
USPC .................. 280/656, 799; 414/509, 517, 521
See application file for complete search history.

(56) References Cited

U.S. PATENT DOCUMENTS

| | | | |
|---|---|---|---|
| 3,712,639 A | 1/1973 | Rysdam, II | |
| 4,260,317 A * | 4/1981 | Martin | B60P 1/006 |
| | | | 280/656 |
| 5,110,149 A * | 5/1992 | Dahlstrom | B62D 53/067 |
| | | | 280/401 |
| 5,163,698 A * | 11/1992 | Evens | B60P 3/41 |
| | | | 280/401 |
| 6,050,578 A | 4/2000 | Beck | |
| 6,332,627 B1 | 12/2001 | Damron | |
| 7,677,625 B2 * | 3/2010 | Gosselin | B62D 21/14 |
| | | | 280/785 |
| 10,543,875 B2 * | 1/2020 | Morena | B62D 53/067 |
| 2006/0119080 A1 | 6/2006 | Damron | |
| 2007/0104560 A1 | 5/2007 | Hall | |

* cited by examiner

*Primary Examiner* — James Keenan
(74) *Attorney, Agent, or Firm* — George L Williamson

(57) ABSTRACT

Method and apparatus for an extendable logging trailer constructed of left and right main I-beam members having left and right male telescoping beams moving on rollers on the bottom inner flange of the main I-beam members. The male telescoping beams allow the trailer to be retractable or extendable so that it can assist in offloading the logs/pipes from the logging trailer. In operation, a front bolster and push rack are moved in unison by a first hydraulic cylinder toward the rear of the trailer at the same time as a rear bolster is moved by a second hydraulic cylinder toward the front of the trailer thereby causing the length of the trailer to shorten. As the trailer shortens, the logs/pipes which are carried on the bolsters are forced toward the rear of the trailer so that gravity eventually causes the rear ends of the logs/pipes to fall downwardly toward the ground which allows the operator of the tractor which is pulling the logging trailer to move the logging trailer forwardly causing the logs/pipes to become completely offloaded from the logging trailer.

20 Claims, 3 Drawing Sheets

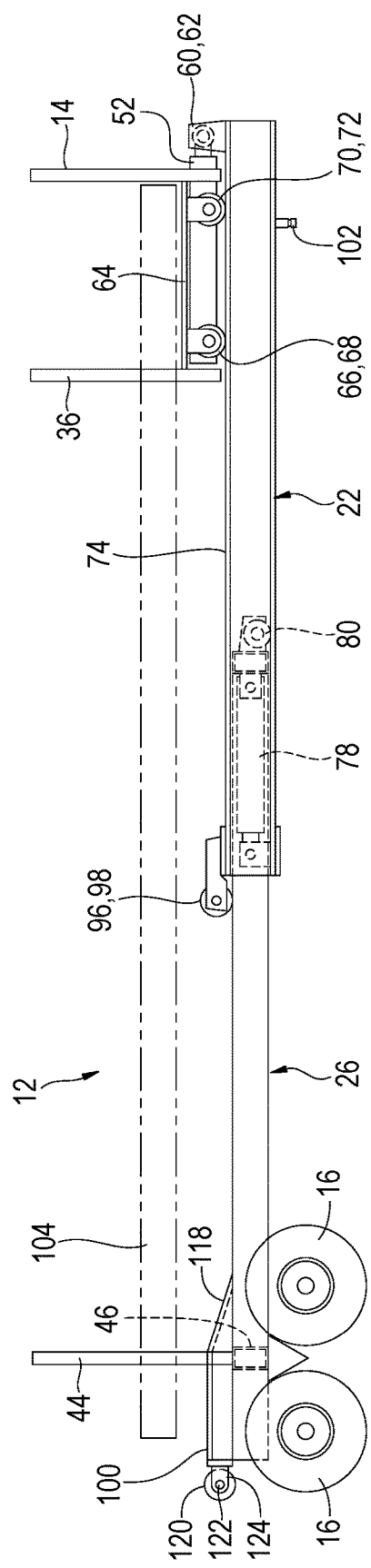
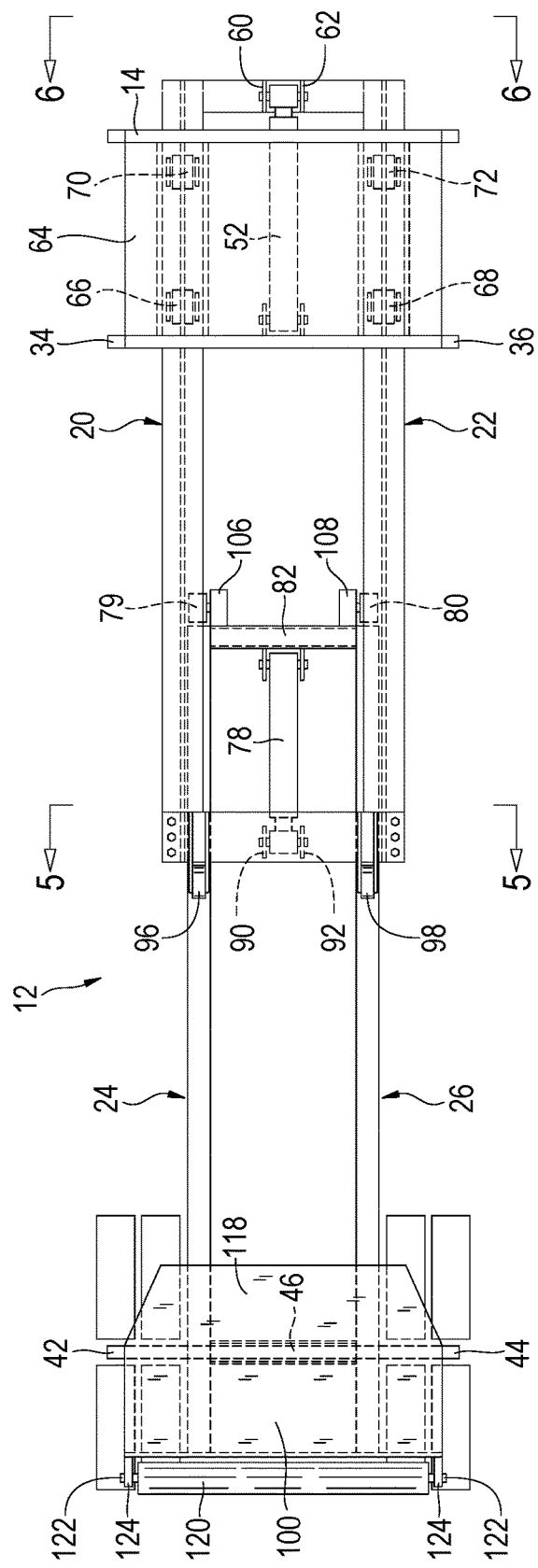
FIG. 2
FIG. 3

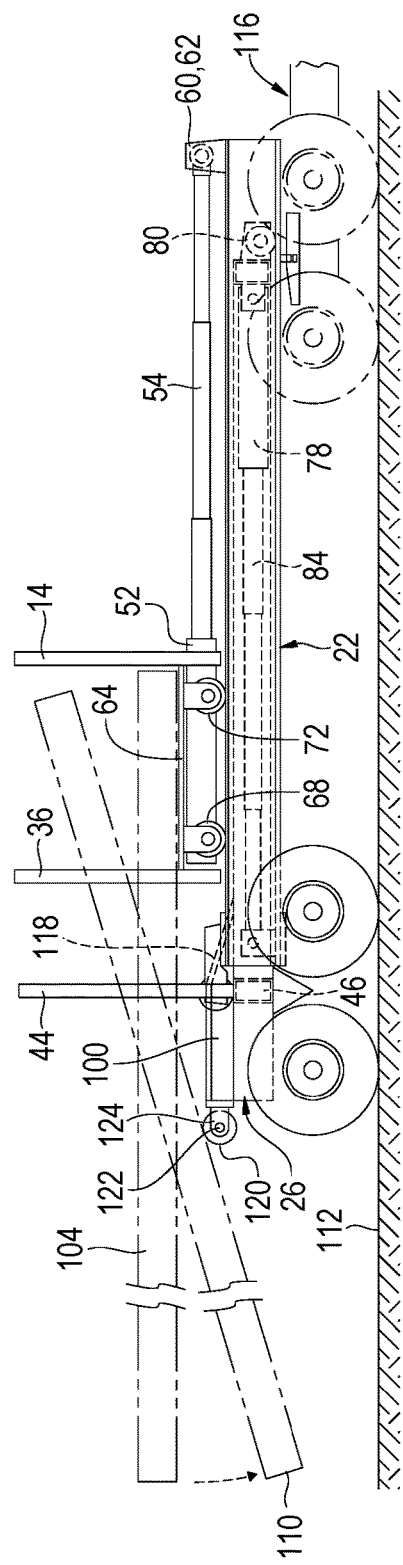
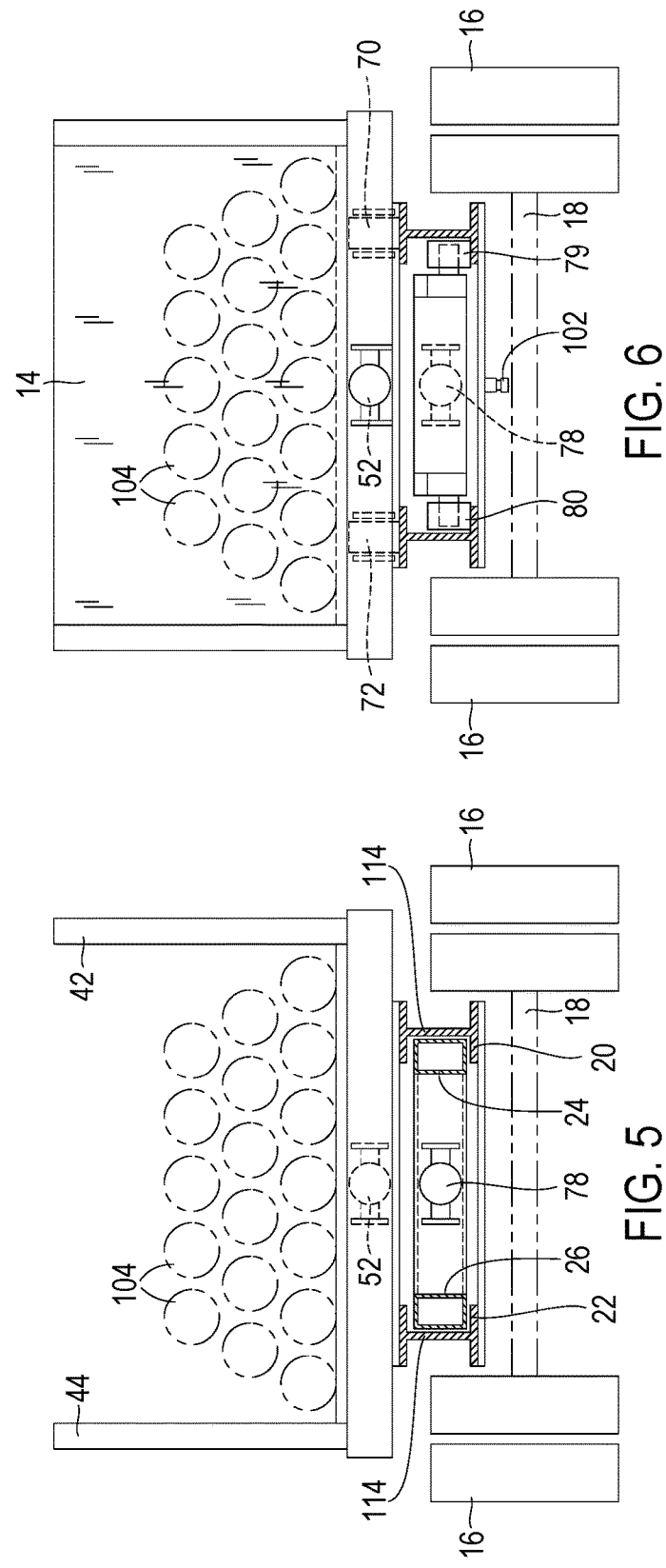

EXTENDABLE TRAILER

BACKGROUND OF THE INVENTION

Field of the Invention

The present invention relates generally to trailers and, more particularly, is concerned with a logging-type trailer which is extendable in length to assist in offloading the logs or similar elongated cylindrical objects such as pipes.

Description of the Related Art

Devices relevant to the present invention have been described in the related art; however, none of the related art devices disclose the unique features of the present invention.

In U.S. Patent Application Publication No. U.S. 2007/0104560 dated May 10, 2007, Hall disclosed a log transporting device. In U.S. Pat. No. 3,712,639 dated Jan. 23, 1973, Rysdam, II, disclosed an extensible bump stake for log trucks. In U.S. Pat. No. 6,050,578 dated Apr. 18, 2000, Beck disclosed a log trailer load booster. In U.S. Patent Application Publication No. 2006/0119080 dated Jun. 8, 2006, Damron disclosed an extendable trailer. In U.S. Pat. No. 6,332,627 dated Dec. 25, 2001, Damron disclosed an extendable trailer.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an extendable logging trailer constructed of left and right main I-beam members having left and right male telescoping beams moving on rollers on the bottom inner flange of the main I-beam members. The male telescoping beams allow the trailer to be retractable or extendable so that it can assist in offloading the logs/pipes from the logging trailer which logs are carried on bolsters in the standard manner. In operation, a front bolster and push rack are moved in unison by a first hydraulic cylinder toward the rear of the trailer at the same time as a rear bolster is moved by a second hydraulic cylinder toward the front of the trailer thereby causing the length of the trailer to shorten. As the trailer shortens, the logs/pipes which are carried on the bolsters are forced toward the rear of the trailer so that gravity eventually causes the rear ends of the logs/pipes to fall downwardly toward the ground which allows the operator of the tractor which is pulling the logging trailer to move the logging trailer forwardly causing the logs/pipes to become completely offloaded from the logging trailer.

An object of the present invention is to provide a logging trailer which can assist in offloading the logs/pipes which are being carried on it. A further object of the present invention is to provide a logging trailer which can be varied in length by having male telescoping beams roll on the bottom inner flanges of the main I-beam support members of the logging trailer. A further object of the present invention is to provide a logging trailer which uses hydraulic cylinders to vary the length of the trailer. A further object of the present invention is to provide a logging trailer which can be easily operated by a user. A further object of the present invention is to provide a logging trailer which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is a side elevation of the present invention in an extended configuration showing logs being carried thereon.

FIG. 3 is a plan view of the present invention.

FIG. 4 is a side view of the present invention in a retracted configuration showing logs being carried thereon.

FIGS. 5 and 6 are cross sectional views of the present invention taken from FIG. 3 as indicated.

LIST OF REFERENCE NUMERALS

Figure 1:
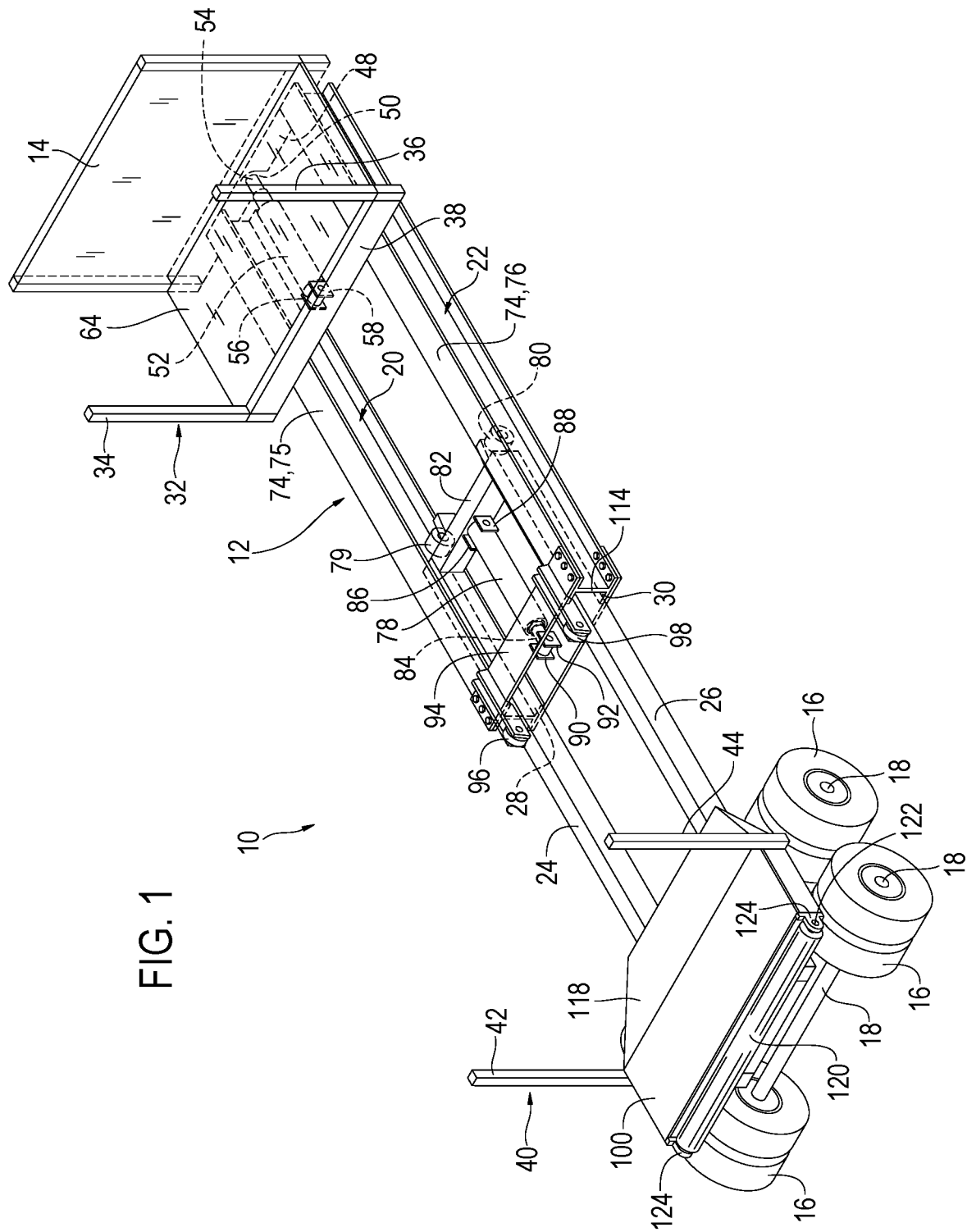
FIG. 1 is a perspective view of the present invention.

With regard to reference numerals used, the following numbering is used throughout the drawings.

10 present invention
12 logging trailer
14 push rack
16 wheels
18 axle
20 left main I-beam
22 right main I-beam
24 left male telescoping beam
26 right male telescoping beam
28 inner bottom flange of left main I-beam
30 inner bottom flange of right main I-beam
32 front bolster
34 left upright
36 right upright
38 cross member
40 rear bolster
42 left upright
44 right upright
46 cross member
48 cross member
50 slot
52 first hydraulic cylinder
54 first piston arm
56 left boss
58 right boss
60 left boss
62 right boss
64 platform
66 left rollers 68 right roller
70 left roller
72 right roller
74 upper surface of flange
75 upper flange of left main I-beam
76 upper flange of right main I-beam
78 second hydraulic cylinder
79 left roller
80 right roller
82 second cross member
84 second piston arm
86 left boss
88 right boss
90 left boss
92 right boss
94 cross member
96 left auxiliary roller
98 right auxiliary roller
100 rear flat plate
102 kingpin
104 log/pipe
106 left lug
108 right lug
110 rear end of log
112 ground surface
114 web
116 tractor
118 ramp
120 roller
122 axle
124 pillow block

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 6 illustrate the present invention wherein an extendable logging trailer for offloading logs or similar elongated cylindrical objects, e.g., pipes, is disclosed and which is generally indicated by reference number 10.

Turning to FIGS. 1-3, therein is shown the present invention 10 being a logging trailer 12 having a push rack 14 on a front end thereof and a plurality of wheels 16 carried on at least one axle 18 on its rear end. Wheels 16 could be equipped with flotation tires for use in swampy conditions. The logging trailer 12 has a left and right spaced apart main I-beam 20, 22 along with a left and right spaced apart male telescoping beam member 24, 26 wherein the left male telescoping member 24 rolls on the bottom inner flange 28 of the left main I-beam 20 and the right male telescoping member 26 rolls on the right inner bottom flange 30 of the right main I-beam 22. All of the beams 20, 22, 24 and 26 are elongated and parallel to each other and while beams 20, 22 are I-beams, the beams 24, 26 are box or rectangular shaped tubing. The trailer 12 is shown having a front bolster 32 having left and right uprights 34, 36 and a lower connecting bolster cross member 38 along with a rear bolster 40 having left and right uprights 42, 44 along with a lower cross member 46 extending between the left and right uprights. The push rack 14 mounted on the front of the trailer 12 has a lower cross-member 48 wherein having a slot 50 cut out of its middle position to allow for the piston arm 54 from a first hydraulic cylinder 52 having a piston arm 54 to pass through the slot 50. The first hydraulic cylinder 52 has an end mounted on left and right bosses 56, 58 which are mounted onto the cross member 38 of the front bolster 32 wherein the front of the piston arm 54 is mounted onto left and right bosses 60, 62 mounted on the front end of the trailer 12 so that when the piston arm 54 of the first hydraulic cylinder 52 is extended the bolster 32 moves toward the rear of the trailer 12. The push rack 14 and front bolster 32 are carried on a rolling platform 64 which platform has left and right, front and rear rollers 66, 68 and 70, 72 which roll along the upper surface 74 of the top flange of the upper left and right flanges 75, 76 of the I-beams, 20 22 being left and right main I-beams. The left and right male telescoping beams 24, 26 each have left and right rollers 79, 80 on their front ends which rollers roll along the inner bottom flanges 28, 30 of the left and right main I-beams 20, 22, respectively.

A second hydraulic cylinder 78 is mounted to a cross member 82 between rollers 79, 80 which has a second piston arm 84 wherein the second hydraulic cylinder 78 is mounted on left and right bosses 86, 88 mounted on the cross member 82 wherein the second piston arm 84 is mounted on left and right bosses 90, 92 which bosses are mounted on a cross-member 94 running between the left and right main I-beams 20, 22 so that when the hydraulic cylinder 78 extends the cross member 82 along with the left and right male telescoping beams 24, 26 are moved toward the front of the trailer 12 thereby causing the trailer to become shorter in length. Additionally, left and right auxiliary rollers 96, 98 are also provided on cross member 94 which allows the left ad right male telescoping beams 24, 26 to more easily slide within the main I-beams 20, 22 as previously disclosed. Also shown on the rear of trailer 12 is a rear flat plate 100 which is provided on top of the left and right male telescoping beams 24, 26 to give the logs or pipes 104 a flat surface to slide on and also provides support for the rear ends of the logs or pipes 104 as also does the cross members of the bolsters. A ramp 118 is provided on the front of plate 100 to make it easier for logs/pipes 104 to slide over the plate and to minimize snagging on the plate. Also shown is a roller 120 being rotatable on an axle 122 supported in sup ort brackets or pillow blocks 124 on each end, wherein the roller reduces the friction of the logs/pipes 104 sliding off the rear of trailer 12 and the longitudinal axis of the roller is perpendicular to the path of the logs/pipes and parallel to the rear edge of the trailer.

Turning to FIG. 2, therein is shown the kingpin 102 on the underside of the front of the trailer 12, wherein the kingpin 102 extends downwardly and protrudes from the underside of the trailer 12 in the conventional manner so as to be connected to the fifth wheel coupler of the tractor 116 (see FIG. 4) that would be used to pull the trailer 12. Also shown is an exemplary log/pipes 104 shown mounted on the bolsters 32, 40. Also shown are previously disclosed elements.

Turning to FIG. 3, therein are shown the left and right rollers 79, 80 which have been previously disclosed, which rollers are shown mounted on forwardly extending lugs 106, 108 which lugs extend forwardly from cross member 82. Also shown are previously disclosed elements.

Turning to FIG. 4, therein is shown the trailer 12 of the present invention 10 in a contracted position wherein the first hydraulic cylinder 52 and the second hydraulic cylinder 78 are each shown in an extended position which causes the trailer 12 to have a shortened configuration so that the logs/pipes 104 are pushed toward the rear of the trailer by push rack 14 so that eventually the rear end 110 of the log/pipe will drop down due to gravity to make contact with the surface of the ground 112 so that the trailer can then be moved forwardly by towing tractor 116 to allow the logs/pipes 104 to be completely offloaded from the trailer 12. Also shown are previously disclosed elements.

Turning to FIGS. 5-6, therein are shown previously disclosed elements of the present invention 10. Web 114 of the left and right main I-beams 20, 22 is also shown.

By way of summary and with reference to FIGS. 1-6, the kingpin 102 fits into a conventional fifth-wheel coupling providing the link between the logging trailer 12 and the towing truck or tractor 116. The coupling used for the present invention 10 is a conventional coupling as would be used in the standard manner by one skilled in the art.

The hydraulic cylinders 52, 78 are also conventional and are expected to function with a conventional hydraulic system which is normally or factory equipped on a standard heavy-duty towing vehicle such as a tractor 116 and which would be used in the standard manner by one skilled in the art. The hydraulic system would use compressed fluid to transfer force applied at one point to another point and would have the normal components and be operated, activated and controlled in the normal manner as would be done in the standard manner by one skilled in the art.

The present invention 10 is not intended to be operated on a typical public highway nor is it sized to do so because it is expected to be too wide to be towed on a public highway. While it is possible that it could be operated on a public highway, it is expected that a special permit would have to be obtained to do so. The present invention 10 is a non-highway use trailer for use in, e.g., swampy and/or forested conditions, and can be towed in the extended or retracted position.

In detailed summary and by making reference to FIGS. 1-6, the present invention 10 discloses an extendable trailer for offloading logs/pipes 104 having a pair of left and right spaced main I-beams 20, 22 extending rearwardly from and supported by rear wheels of a tractor 116; a pair of left and right spaced male telescoping I-beams 24,26 supported by wheels 16 at a rear end of the telescoping I-beams, front ends of the telescoping I-beams extending into and slidable within inner flanges 28,30 of the main I-beams for changing the length of the trailer, a rolling platform 64 on the main I-beams movable along the length of the main I-beams, the rolling platform comprising a flat bottom, an upwardly extending push rack 14 located at a front end thereof, and right and left side wheels 66,70 under the flat bottom for riding along upper surfaces of flanges of the main I-beams; a first hydraulic cylinder 52 located under the bottom of the rolling platform between right and left side wheels of the rolling platform having a closed end attached to the rolling platform and an oppositely extending first extensible piston rod with a distal end thereof being attached to front ends of the main I-beams for moving the rolling platform along the main I-beams; and, a second hydraulic cylinder 78 mounted between the telescoping I-beams having a closed end attached to rollers riding along the inner flanges of the main I-beams, and an opposite end of the second hydraulic cylinder out of which extends rearwardly a second extensible piston rod with a distal end thereof attached 90, 92 to rearward ends of the main I-beams whereby activation of both the first and second hydraulic cylinders causes the rolling platform to move rearwardly with the push rack pushing the logs rearwardly, and the telescoping I-beams to retract into the main I-beams causing rear ends of the logs to drop down from a rear of the trailer, allowing forward movement of the tractor and trailer to drop the logs completely off the trailer without use of a crane. Furthermore, the present invention 10 includes a flat bottom of the rolling platform has a first pair of left and right uprights located at rear end sides of the platform for help containing the logs on the trailer; a second pair of left and right uprights located adjacent rear ends of the telescoping I-beams for help containing the logs on the trailer, in which left and right auxiliary rollers 96,98 are mounted on a cross member 94 extending between top rear ends of the main i-beams which allows the left and right telescoping I-beams to more easily slide within main I-beams, in which a rear flat plate 100 is provided on a rear of the trailer on top of the left and right telescoping I-beams to give the logs a flat surface to slide on, in which a kingpin 102 on an underside of a front of the trailer, the kingpin extending downwardly and protruding so as to be connected to a fifth wheel coupler of the tractor, in which the rollers attached to the closed end of the second hydraulic cylinder which are mounted on forwardly extending lugs extending forwardly from a cross member joining the left and right extensible I-beams, and, in which the closed end of the first hydraulic cylinder is mounted on left and right bosses which are mounted on a cross member extending between bottom ends of the left and right uprights. Also, a roller 120 may be disposed on a rear end of the trailer 12.

I claim:

1. An extendable trailer for offloading logs, comprising:
   a) left and right spaced main I-beams extending rearwardly from and supported by rear wheels of a tractor,
   b) left and right spaced male telescoping beams supported by wheels at a rear end of said telescoping beams, front ends of said telescoping beams tending into and slidable within inner flanges of said main I-beams for changing the length of the trailer;
   c) a rolling platform on said main I-beams movable along the length of said main I-beams, said rolling platform comprising a flat bottom, an upwardly extending push rack located at a front end thereof and right and left side wheels under said flat bottom for riding along upper surfaces of flanges of said main I-beams;
   d) a first hydraulic cylinder located under said bottom of said rolling platform between said right and left side wheels of said rolling platform having a closed end attached to said rolling platform and an oppositely extending first extensible piston rod with a distal end thereof being attached to front ends of said main I-beams for moving said rolling platform along said main I-beams; and
   e) a second hydraulic cylinder mounted between said telescoping beams having a closed end attached to rollers riding along said inner flanges of said main I-beams, and an opposite end of said second hydraulic cylinder out of which extends rearwardly a second extensible piston rod with a distal end thereof attached to rearward ends of said main I-beam whereby activation of both said first and second hydraulic cylinders causes said rolling platform to move rearwardly with said push rack pushing said lops rearwardly, and said telescoping beams to retract into said main I-beams causing rear ends of said logs to drop down from a rear of said trailer, allowing forward movement of said tractor and trailer to drop said logs completely off said trailer without use of a crane.

2. The extendable trailer of claim 1, in which said flat bottom of said rolling platform has a first pair of left and right uprights located at rear end sides of said platform for help containing said logs on said trailer.

3. The extendable trailer of claim 2, having a second pair of left and right uprights located adjacent rear ends of said telescoping beams for help containing said logs on said trailer.

4. The extendable trailer of claim 3, in which left and right auxiliary rollers are mounted on a cross member extending between top rear ends of said main I-beams which allows said left and right telescoping beams to more easily slide within main I-beams.

5. The extendable trailer of claim 4, in which a rear flat plate is provided on a rear of the trailer on top of the left and right telescoping beams to give said logs a flat surface to slide on.

6. The extendable trailer of claim 5, in which a kingpin is disposed on an underside of a front of the trailer, said kingpin extending downwardly and protruding so as to be connected to a fifth wheel coupler of said tractor.

7. The extendable trailer of claim 6, in which said rollers attached to said closed end of said second hydraulic cylinder are mounted on lugs extending forwardly from a cross member joining said left and right telescoping beams.

8. The extendable trailer of claim 7, in which said closed end of said first hydraulic cylinder is mounted on left and right bosses which are mounted on a cross member extending between bottom ends of said left and right uprights.

9. The extendable trailer of claim 8, in which a pipe may be offloaded from the trailer.

10. The extendable trailer of claim 8, further comprising a roller being disposed on said rear of the trailer.

11. A method of offloading logs from an extendable trailer, comprising the steps of:
 a) providing a pair of left and right spaced main I-beams extending rearwardly from and supported by rear wheels of a tractor;
 b) providing a pair of left and right spaced male telescoping beams supported by wheels at a rear end of the telescoping beams, front ends of the telescoping beam extending into and slidable within inner flanges of the main beams for changing the length of the trailer;
 c) providing a rolling platform on the main I-beams movable along the length of the main I-beams, the rolling platform comprising a flat bottom, an upwardly extending push rack located at a front end thereof; and right and left side wheels under the flat bottom for riding along upper surfaces of flanges of the main I-beams;
 d) providing a first hydraulic cylinder located under the bottom of the rolling platform between right and left side wheels of the rolling platform having a closed end of the first hydraulic cylinder attached to the rolling platform and an oppositely extending first extensible piston rod with a distal end thereof being attached to front ends of the main I-beams for moving the rolling platform along the main I-beams;
 e) providing a second hydraulic cylinder mounted between the telescoping beams having a closed end attached to rollers riding along the inner flanges of the main I-beams, and an opposite end of the second hydraulic cylinder out of which extends rearwardly a second extensible piston rod with a distal and thereof attached to rearward ends of the main I-beams;
 f) offloading the logs from the extendable trailer by activating both the first and second hydraulic cylinders to cause the rolling platform to move rearwardly on the main I-beams with the push rack pushing the logs rearwardly, and retracting the telescoping beams to telescope into the main I-beams causing the rear ends of the logs to drop down from a rear of the trailer; and
 g) moving the tractor and trailer forwardly to drop the logs completely off the trailer without use of a crane.

12. The method of claim 11, in which the flat bottom of the rolling platform has a pair of left and right uprights located at rear end sides of said platform for help containing the logs on the trailer.

13. The method of claim 12, having a second pair of left and right uprights located adjacent rear ends of the telescoping beams for help containing the logs on the trailer.

14. The method of claim 13, in which left and right auxiliary rollers are mounted on a cross member extending between top rear ends of the main I-beams which allows the left and right telescoping beams to more easily slide within the main I-beams.

15. The method of claim 14, in which a rear flat plate is provided on a rear of the trailer on top of the left and right telescoping beams to give the logs a flat surface to slide on.

16. The method of claim 15, in which a kingpin is placed on an underside of a front of the trailer, the kingpin extending downwardly and protruding so as to be connected to a fifth wheel coupler of the tractor.

17. The method of claim 16, in which the rollers attached to the closed end of the second hydraulic cylinder are mounted on lugs extending forwardly from a cross member joining the left and right telescoping beams.

18. The method of claim 17, in which the closed end of the first hydraulic cylinder is mounted on left and right bosses which are mounted on a cross member extending between bottom ends of the left and right uprights.

19. The method of claim 18, in which a pipe may be offloaded from the trailer.

20. The method of claim 18, further comprising the step of providing a roller on the rear of the trailer.

* * * * *